Sept. 10, 1946.    W. F. HEROLD    2,407,421
FLOOR-CLEANING IMPLEMENT
Filed May 26, 1944    2 Sheets-Sheet 1
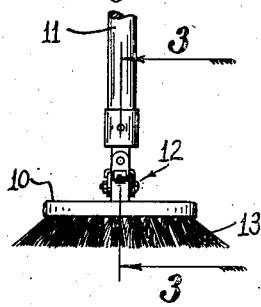
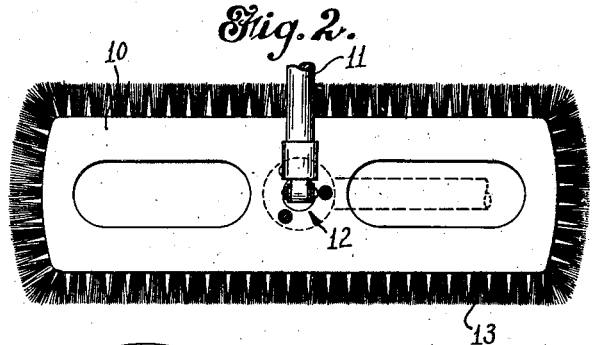
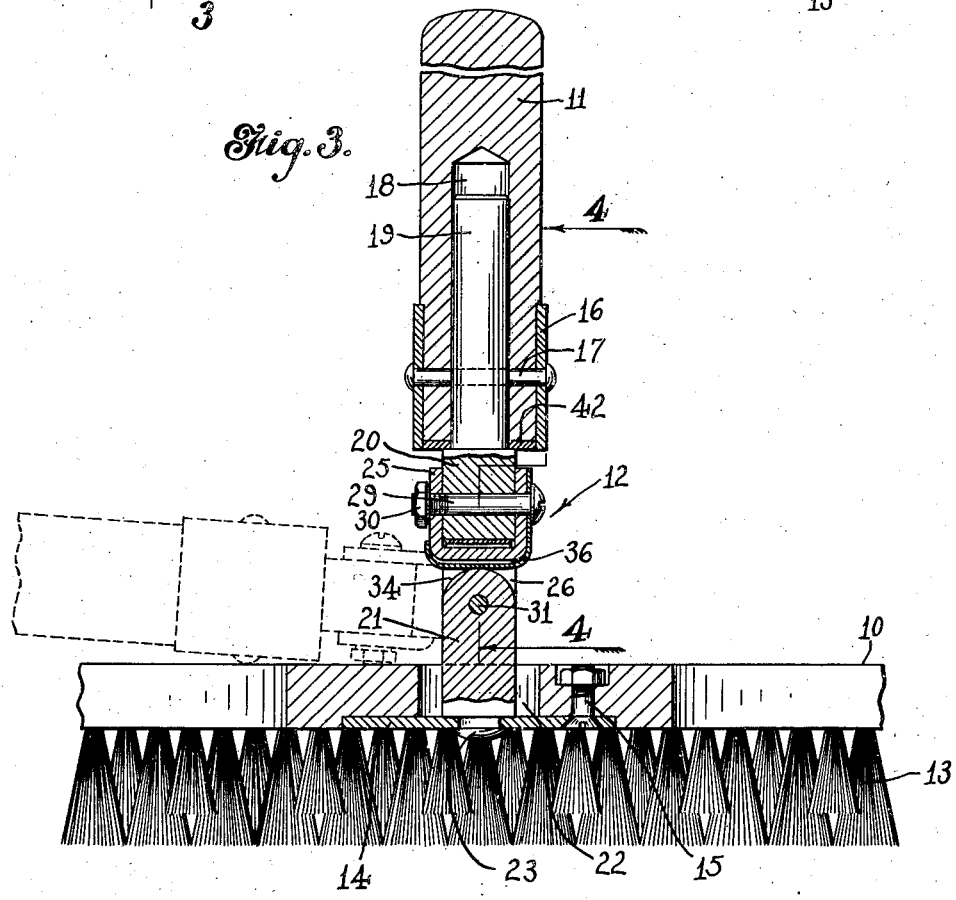
Inventor
Walter F. Herold

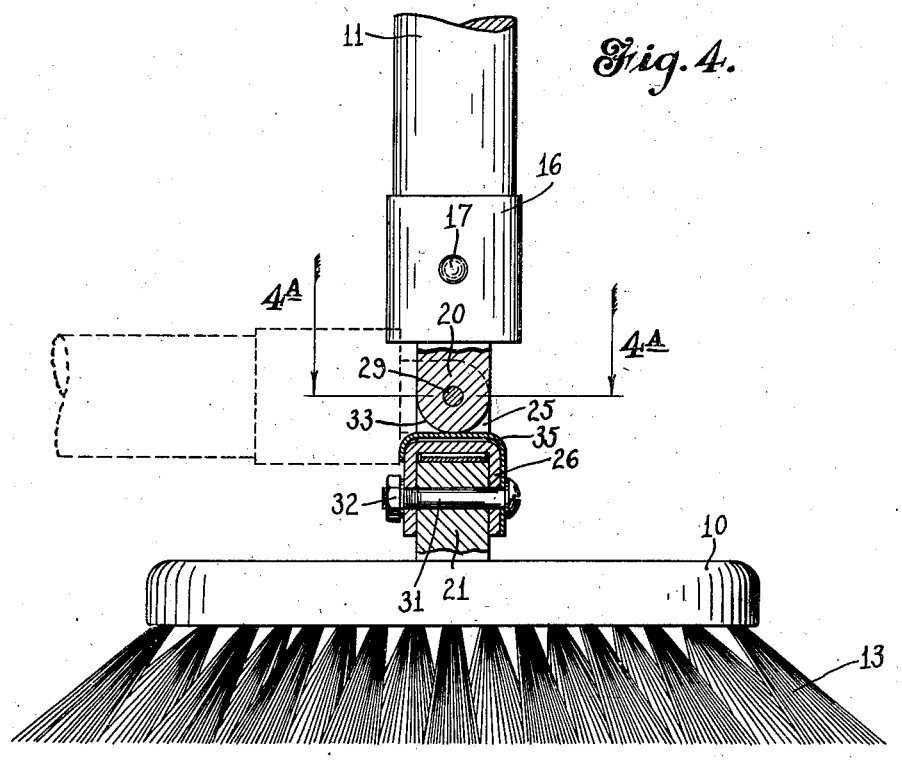
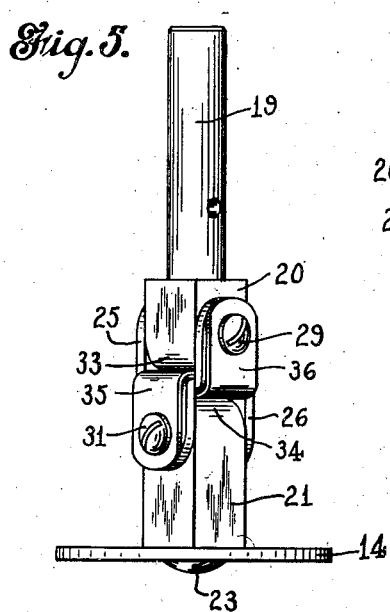
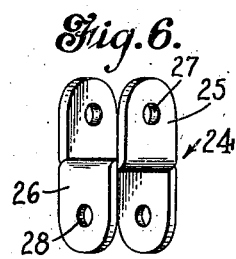
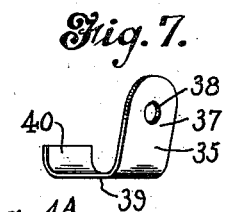
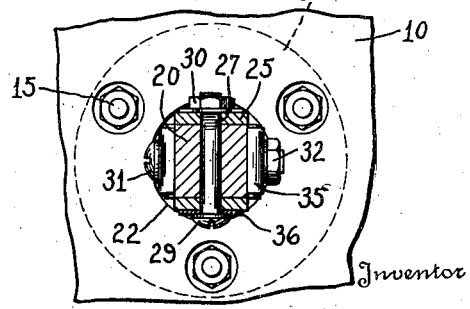

Patented Sept. 10, 1946

2,407,421

UNITED STATES PATENT OFFICE 2,407,421

FLOOR-CLEANING IMPLEMENT

Walter F. Herold, Easton, Conn., assignor to The Bassick Company, Bridgeport, Conn., a corporation of Connecticut Application May 26, 1944, Serial No. 537,496

8 Claims. (Cl. 306—11)

This invention relates to floor-cleaning implements, and more particularly to those applicable to the cleaning of the floors of office buildings and similar buildings. For such use a long-handled implement of the type of a brush or mop is commonly employed. In the preferred form the implement of the present invention has a long handle and an elongated brush-like head, and the same is peculiarly adapted to the cleaning of floors covered with linoleum, but the implement of the invention can also be used for other purposes.

One of the objects in view is to provide an implement whereby the floor can be cleaned more effectively and conveniently than heretofore.

Another object is to facilitate the use of the implement in the cleaning of the floors of corridors and the floors of offices, residences and the like where it is desirable to clean the floor without a great deal of moving and shifting of furniture.

To these and other ends the invention consists in the novel features and combinations of parts to be hereinafter described and finally pointed out in the claims.

In the accompanying drawings:

Fig. 1 is an elevation of the lower portion of a long-handled floor-cleaning implement embodying the invention, the handle being in vertical position;

Fig. 2 is a plan view of the article shown in Fig. 1, the handle being swung down toward one side of the brush head;

Fig. 3 is an enlarged section on line 3—3 of Fig. 1;

Fig. 4 is a section on line 4—4 of Fig. 3;

Fig. 4A is a section on line 4A—4A of Fig. 4;

Fig. 5 is an elevational view of the joint structure connecting the head and the handle;

Fig. 6 is a perspective view of the members providing the joint frame; and

Fig. 7 is a perspective view of one of the friction members.

In the drawings, there is shown for purposes of illustration a floor-cleaning implement in the nature of a long-handled brush embodying my improvements. Here the cleaning head is in the nature of a relatively shallow brush which is elongated, the length being considerably in excess of the width. To the head is attached a long handle of a length usual in mops. This handle is connected to the head by a joint structure having the features hereinafter described, which enables the handle to be used for moving the brush head along the floor sidewise or endwise, or at any of innumerable angles in the floor space, as may be dictated by the conditions of use and the convenience of the user.

In the drawings, the elongated brush head is shown at 10, the handle at 11, and the joint structure between the head and handle at 12. The head 10 is generally of rectangular shape, having in this instance a length approximately three times the width, although the invention is not limited in this respect. At the lower face of the head are bristles 13. In this particular case the joint structure 12 is fastened to the head 10 by means of an attaching plate 14 secured to the under surface of the head or brushback by means such as bolts 15. The joint structure 12 is secured to the handle 11 by means including a ferrule 16 at the lower end of the handle, the handle usually being made of wood. In connection with the ferrule 16 a fastening pin 17 is employed, as hereinafter described. The lower end of the wooden handle 11 is provided with a socket 18 in which is received a metal shank 19 forming a part of the joint structure 12. At the lower end of the shank 19 is an integral head 20 which is universally connected to the brush, and more particularly to a lug or head 21 extending upwardly from the plate 14. The lug or head 21 is accommodated in a round recess 22 in the back portion of the brush, and is attached to the plate 14 by suitable means, for example, by having a portion of member 21 extended through a perforation in plate 14, and headed over or riveted as shown at 23.

The upstanding lug or head 21 and the head or lug 20 are swingingly connected to a frame generally indicated at 24, and in this instance comprising two separate parts, although this is not always necessary. In the form shown, the frame comprises upper and lower U-shaped clips 25 and 26 nested together. The clip 25 has its connecting portion lowermost, and the clip 26 has its connecting portion uppermost and nested in the space between the legs of clip 25, the arrangement being such that there can be no turning movement of the clips relatively to each other in a plane perpendicular to the axis of the handle. The legs of the clip 25 are each provided with a perforation 27, and the clip 26 has similar perforations 28, enabling the lug 20 to be pivoted to the upper clip by a bolt 29 having a nut 30 on one end, and enabling the head 21 to be pivoted to the lower clip by a bolt 31 having a nut 32. The bolts 29 and 31 are at right angles to each other, providing pivots for the members 20, 21 such that the handle can be swung to any angle relatively to the brush.

For the purpose of holding the brush and handle firmly in any position to which they have been adjusted, suitable holding means in the nature of friction members are associated with the joint structure 12, and in the particular form shown the structure is as follows: The lower end portion of lug 20 is provided with a partly cylindrical surface 33 formed on an arc concentric with bolt 29, and similarly the upper end of lug 21 is formed with a partly cylindrical surface 34 formed on an arc concentric with bolt 31. The first of these partly cylindrical surfaces is located closely adjacent the bottom of the upper forked portion provided by frame 24, and the second such partly cylindrical surface is located closely adjacent the bottom of the lower fork. Frictionally engaged with the surface 33 is a friction member 35 supported by bolt 31, whereas a similar friction member 36, supported by bolt 29, acts against the surface 34. The friction members 35 and 36 are identical, and one of them, 35, is shown in detail in Fig. 7, from which it will be seen that the member is in the form of a leaf spring having a leg 37 provided with a perforation 38. The leg 37 is adapted to lie alongside one of the legs of the frame 24 at the outer side, and to be held in position by the head of bolt 31 in the manner shown. At an angle to the leg 37 the friction member has a portion 39 with a curved extremity 40. The portions 37 and 39 normally lie at an obtuse angle to each other, as shown in Fig. 7, but when the assemblage is completed the spring is put under pressure, with the result that a smooth planar portion on leg 39 presses against the cylindrical surface 33, as shown in Fig. 4. By this spring pressure of the friction member or shoe the joint structure will be firmly held in any position to which it is adjusted. As will be seen from Fig. 4, the extremity or tip 40 of the spring abuts the frame portion to which the spring is applied, so that there is created a support for the spring at this end as well as adjacent the other end.

It is understood that there is a fairly snug fit between each of the heads or lugs 20, 21 and its associated legs of the frame 24, the lug being of a length to fit at its planar end faces against the inner surfaces of the frame legs, and of course the associated bolt when tightened serves to increase the firmness of the lug seating; and in addition to this the deflected leaf springs act on the lugs to hold them in the angular positions to which they are adjusted. The lug 20 is squared off at its upper surface to create a shoulder 41, and the shank 19 projects upwardly from this shouldered portion, the arrangement being such that the shoulder will hold and position a disk 42, which is of a diameter to fit within the lower end of the ferrule 16. In assembling the parts the disk 42 is placed in position around the shank 19, and the latter then pushed up into the socket 18, carrying the disk up into the ferrule. A pin is then thrust through perforations in the ferrule and the perforation 43 in the shank, and is then riveted over at the end to present the riveted fastening pin 17, shown in Fig. 3. Thus the disk 42 is firmly held in place, and it is in a location to enclose and protect the wood at the lower extremity of the handle, and the disk cannot become displaced relatively to the other parts, the same being effectively held between the lug 20 and the wooden part of the handle.

It will be noted that in the particular case shown the handle, if moved from a perpendicular position to a position in which it is substantially horizontal, as shown in Fig. 3, and disposed lengthwise of the brush, turns about the lower bolt 31 as an axis. If the handle be moved from the perpendicular position to the transverse position, shown in full lines in Fig. 2 and in dotted lines in Fig. 4, the movement will be about the upper bolt as an axis. This is the preferred arrangement, but variation may be made in that respect if desired. In the movement of the handle from the perpendicular position to any of innumerable angular positions with respect to the brush, the swinging movement takes place in part about one axis and in part about the other axis.

In the cleaning of the floors of office rooms and other rooms it is desirable to obviate as far as possible the necessity of shifting furniture, especially heavy furniture, and where the cleaning implement can be readily introduced under tables, desks, chairs and other furniture, this is obviously a matter of advantage. The herein described implement provides this advantage in large measure, and increases the scope of the implement as compared to those previously used. Where the furniture is of a type where a desk body, for example, lies quite close to the floor, it is of manifest advantage to be able to insert the brush or other cleaning head as far as is necessary for cleaning the floor space under the desk without moving the latter, and it is evident that where, as in the present case, the handle can readily be swung down to a position such as indicated by the dotted lines in Fig. 3, where it is close to and substantially parallel to the cleaning head, it is possible to meet the conditions just mentioned. In the position of the handle indicated in Fig. 3 the handle is disposed lengthwise of the elongated head, as has been indicated above. If more space should be available over the floor area in question, the handle position might be that indicated in dotted lines in Fig. 4, where the handle is transverse to the cleaning head. In various other conditions in which it is desired to work under a piece of furniture, the handle may be at any of various angles to a horizontal plane and/or to a given vertical plane as may be most convenient.

The improved implement is also of advantage in the cleaning of floors of places other than rooms. For example, in cleaning a floor of a corridor in a building, especially where the corridor is not unduly wide, it has been found very convenient to clean the floor by a lateral traversing movement of the cleaning head across the corridor from one side to the other. In performing this particular operation the work is very much facilitated by the fact that the brush head may, for the most part, be used in a position in which it is oblique with respect to its direction of movement. Such a condition and various other conditions are met in a very satisfactory way in a cleaning implement such as herein described, the result being that, as compared to prior implements, the present one is noticeably more effective, more convenient, noticeably reduces the amount of muscular effort, and shortens to a noticeable degree the time consumed in cleaning a given floor space.

Where the floor is covered with linoleum, a brush head such as herein shown can be employed, there being used in connection with the brush a towel or other cloth wrapping which picks up the fine grit that is not picked up in the ordinary brushing or mopping.

While there is shown here but a single embodiment of the invention, it is to be understood that the invention is suscepitble of numerous other embodiments and that various modifications in the organization of elements and in the details may be used without departing from the principles of the invention or the scope of the claims.

What I claim is:

1. In a floor-cleaning implement, the combination of a head, a handle, a frame member between said head and handle having in connection therewith upper and lower pivot members at right angles to each other, a member connected to the handle pivoted to the frame member by means of one of said pivot members, a member connected to the cleaning head pivoted to the frame member by means of the other pivot member, and friction means in connection with the structure for holding the handle firmly in any of a number of positions acutely angled to a perpendicular line, said friction means comprising spring friction shoes interposed between said frame and said members and acting on said members, said friction shoes being held in position by the respective pivot members.

2. The combination of a lug adapted to be attached to a brush head, a lug adapted to be attached to a handle, a frame comprising internested U-shaped clips having pivot axes arranged at right angles to each other, pivot members pivoting said lugs in said frame on said axes, said lugs having cylindrical surfaces on the portions thereof located in said frame, and friction shoes comprising deflected springs carried by said pivot members and bearing against said cylindrical surfaces on the lugs.

3. A floor-cleaning implement of the long-handled brush type comprising a brush head, a long handle, a lug carried by the head intermediate of the ends of the head, a lug carried by the end of the handle, means providing a universal connection between said lugs comprising a frame having upper and lower pivot members arranged at right angles to each other, said pivot members providing swinging axes for the respective lugs so that the handle can swing from a position in which it is perpendicular to the brush head to a multiplicity of acutely angled positions with respect to the perpendicular, and self-acting holding means for holding the handle firmly in any of such positions to which it is swung so that any predetermined angular position of the handle to the head will be maintained, said last-named means comprising resilient friction shoes interposed between the respective lugs and the frame.

4. A floor-cleaning implement of the long-handled brush type comprising a brush head, a long handle, a lug carried by the head intermediate of the ends of the head, a lug carried by the end of the handle, means providing a universal connection between said lugs comprising a frame having upper and lower pivot members arranged at right angles to each other, said pivot members providing swinging axes for the respective lugs so that the handle can swing from a position in which it is perpendicular to the brush head to a multiplicity of acutely angled positions with respect to the perpendicular, and self-acting holding means for holding the handle firmly in any of such positions to which it is swung so that any predetermined angular position of the handle to the head will be maintained, said last-named means comprising relatively fixed resilient shoes bearing against curved surfaces on the lugs substantially concentric with the pivot axes.

5. A floor-cleaning implement of the long-handled brush type comprising a brush head, a long handle, a lug carried by the head intermediate of the ends of the head, a lug carried by the end of the handle, means providing a universal connection between said lugs comprising a frame having upper and lower pivot members arranged at right angles to each other, said pivot members providing swinging axes for the respective lugs so that the handle can swing from a position in which it is perpendicular to the brush head to a multiplicity of acutely angled positions with respect to the perpendicular, and self-acting holding means for holding the handle firmly in any of such positions to which it is swung so that any predetermined angular position of the handle to the head will be maintained, said last-named means comprising relatively fixed resilient shoes bearing against curved surfaces on the lugs substantially concentric with the pivot axes, said shoes each being free at one end but held in position at the other end by the corresponding pivot member.

6. A floor-cleaning implement comprising a cleaning head adapted to be moved in contact with the floor, a long handle, a lug fixed to the back of the head, a lug fixed to the end of the handle, a frame between said lugs, upper and lower pivot members in said frame extending at right angles to each other and providing pivot axes for the swinging movement of the respective lugs whereby the handle may be located in any of a multiplicity of acutely angled positions with reference to a perpendicular to the back of the cleaning head, and self-acting friction means acting to hold the handle firmly in any of such positions in the use of the implement in cleaning or swabbing, said last-named means comprising spring pressure members interposed between the respective lugs and the adjacent parts of said frame.

7. A floor-cleaning implement comprising a cleaning head adapted to be moved in contact with the floor, a long handle, a lug fastened to the back of the head, a lug fastened to the end of the handle, a frame intermediate said lugs comprising separate internested U-shaped clips having outstanding perforated arms, the perforations of said arms providing pivot axes one above the other and one at right angles to the other, pivot members engaging said perforations, said lugs having holes through which said pivot members are passed, said lugs being free to pivot about the axes of said pivot members so that the handle can be placed in any of a multiplicity of acutely angled positions with respect to a perpendicular line drawn to the back of the cleaning head.

8. In a floor-cleaning implement, the combination of a cleaning head, a handle, a lug fixed to the back portion of the head, a lug fixed to the end of the handle, means providing upper and lower pivot axes at right angles to each other about which said lugs can swing, including pivot members engaging holes in said lugs, and self-acting friction shoes for maintaining the handle in any angular position to which it is moved held in place by said pivot members and extending into recesses provided in the structure so as to engage different areas of friction surfaces on the lugs.

WALTER F. HEROLD.